US010015770B2

(12) United States Patent
Ekambaram et al.

(10) Patent No.: US 10,015,770 B2
(45) Date of Patent: Jul. 3, 2018

(54) SOCIAL PROXIMITY NETWORKS FOR MOBILE PHONES

(71) Applicant: International Business Machines Corporation, Armonk, NY (US)

(72) Inventors: Vijay Ekambaram, Chennai (IN); Vikas Joshi, Dharwad (IN); Vikrant Nandakumar, Bangalore (IN); Ramasuri Narayanam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 14/223,499

(22) Filed: Mar. 24, 2014

(65) Prior Publication Data
US 2015/0269267 A1  Sep. 24, 2015

(51) Int. Cl.
*G06F 17/30* (2006.01)
*H04W 64/00* (2009.01)
*H04L 29/06* (2006.01)
*G06Q 50/00* (2012.01)

(52) U.S. Cl.
CPC .......... *H04W 64/003* (2013.01); *G06Q 50/01* (2013.01); *H04L 65/403* (2013.01)

(58) Field of Classification Search
CPC ........... G06F 17/30876; H04L 65/403; H04W 64/003; G06Q 50/01
See application file for complete search history.

(56) References Cited

U.S. PATENT DOCUMENTS

| 7,996,479 | B2 * | 8/2011 | Pilgrim | G06Q 10/107 709/206 |
| 8,402,094 | B2 * | 3/2013 | Bosworth | G06Q 30/08 705/319 |
| 8,533,208 | B2 * | 9/2013 | Sundaresan | G06F 17/2785 704/9 |
| 9,027,105 | B1 * | 5/2015 | Saylor | H04L 63/08 707/705 |
| 2009/0163183 | A1 * | 6/2009 | O'Donoghue | G06Q 30/02 455/414.1 |
| 2010/0106573 | A1 * | 4/2010 | Gallagher | G06Q 30/02 705/14.4 |

(Continued)

FOREIGN PATENT DOCUMENTS

WO   WO2012135783 A2   10/2012

OTHER PUBLICATIONS

Amir Seyedi et al., "Proximity-Based Trust Inference for Mobile Social Networking", 2011, IFIP International Federation for Information Processing, pp. 253-264.*

(Continued)

*Primary Examiner* — Jared M Bibbee
(74) *Attorney, Agent, or Firm* — Ference & Associates LLC

(57) ABSTRACT

Methods and arrangements for rendering social proximity networks for mobile phones. A contemplated method includes: obtaining communication data for a mobile phone; deriving from the communication data a social proximity score with respect to at least one individual associated with at least one device that has communicated with the mobile phone; and storing the social proximity score. Other variants and embodiments are broadly contemplated herein.

20 Claims, 4 Drawing Sheets

(56) References Cited

U.S. PATENT DOCUMENTS

| | | | |
|---|---|---|---|
| 2010/0119053 A1* | 5/2010 | Goeldi | G06Q 10/00 379/265.09 |
| 2010/0121707 A1* | 5/2010 | Goeldi | G06Q 10/00 705/14.49 |
| 2010/0306185 A1* | 12/2010 | Smith | G06Q 10/107 707/709 |
| 2011/0029608 A1* | 2/2011 | Harple | H04W 8/22 709/204 |
| 2012/0089698 A1* | 4/2012 | Tseng | G06Q 10/101 709/217 |
| 2012/0158751 A1* | 6/2012 | Tseng | G06Q 30/02 707/751 |
| 2013/0073336 A1* | 3/2013 | Heath | G06Q 30/02 705/7.29 |
| 2013/0102286 A1* | 4/2013 | Toksvig | H04W 4/206 455/412.2 |
| 2013/0179502 A1* | 7/2013 | Faller | H04L 65/403 709/204 |
| 2014/0114988 A1* | 4/2014 | Bar-Zeev | G06F 17/30112 707/749 |
| 2014/0188459 A1* | 7/2014 | Fink | G06F 17/2785 704/9 |
| 2014/0214480 A1* | 7/2014 | Jamal | G06Q 30/0201 705/7.29 |
| 2014/0244531 A1* | 8/2014 | Baldwin | G06Q 50/01 705/319 |
| 2015/0205800 A1* | 7/2015 | Work | G06Q 10/00 707/731 |

OTHER PUBLICATIONS

Quercia, Daniele, Jonathan Ellis, and Licia Capra. "Using Mobile Phones to Nurture Social Networks." IEEE Pervasive Computing 9.3 (2010): pp. 12-20.*

Georg Groh and Jan Hauffa, "Characterizing Social Relations Via NLP-based Sentiment Analysis", 2011, pp. 502-505.*

IP.com (Disclosed Anonymously), "Method and system of publishing and sharing mood status for users of mobile phone," IP.com Prior Art Database Technical Disclosure, Aug. 22, 2011, 5 pages, IP.com Electronic Publication.

Ezzat, et al., "Sentiment Analysis of Call Centre Audio Conversations using Text Classification," International Journal of Computer Information Systems and Industrial Management Applications, ISSN 2150-7988, 2012, pp. 619-627, vol. 4, Dynamic Publishers, Inc., USA.

Schuller et al., "Recognising realistic emotions and affect in speech: State of the art and lessons learnt from the first challenge," Journal of Speech Communication, Nov. 2011, pp. 1062-1087, vol. 53, Issue 9-10, Elsevier Science Publishers B.V., Amsterdam, Netherlands.

* cited by examiner

SOCIAL PROXIMITY NETWORKS FOR MOBILE PHONES

BACKGROUND

Generally, social networking sites and applications have evolved to a point where analysis of the networks in use helps impart a better understanding of how individuals interact, thereby leading to improvements in such sites and applications. However, any such gains have suffered from limited utility in that the use of social networking sites and applications is far from universal. Further, the depth and granularity of any information gained has often been found to be highly limited.

BRIEF SUMMARY

In summary, one aspect of the invention provides a method of rendering social proximity networks for mobile phones, the method comprising: utilizing at least one processor to execute computer code configured to perform the steps of: obtaining communication data for a mobile phone; deriving from the communication data a social proximity score with respect to at least one individual associated with at least one device that has communicated with the mobile phone; and storing the social proximity score.

Another aspect of the invention provides an apparatus for rendering social proximity networks for mobile phones, the apparatus comprising: at least one processor; and a computer readable storage medium having computer readable program code embodied therewith and executable by the at least one processor, the computer readable program code comprising: computer readable program code configured to obtain communication data for a mobile phone; computer readable program code configured to derive from the communication data a social proximity score with respect to at least one individual associated with at least one device that has communicated with the mobile phone; and computer readable program code configured to store the social proximity score.

Another aspect of the invention provides a computer program product for rendering social proximity networks for mobile phones, the computer program product comprising: a computer readable storage medium having computer readable program code embodied therewith, the computer readable program code comprising: computer readable program code configured to obtain communication data for a mobile phone; computer readable program code configured to derive from the communication data a social proximity score with respect to at least one individual associated with at least one device that has communicated with the mobile phone; and computer readable program code configured to store the social proximity score.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Figure 1:
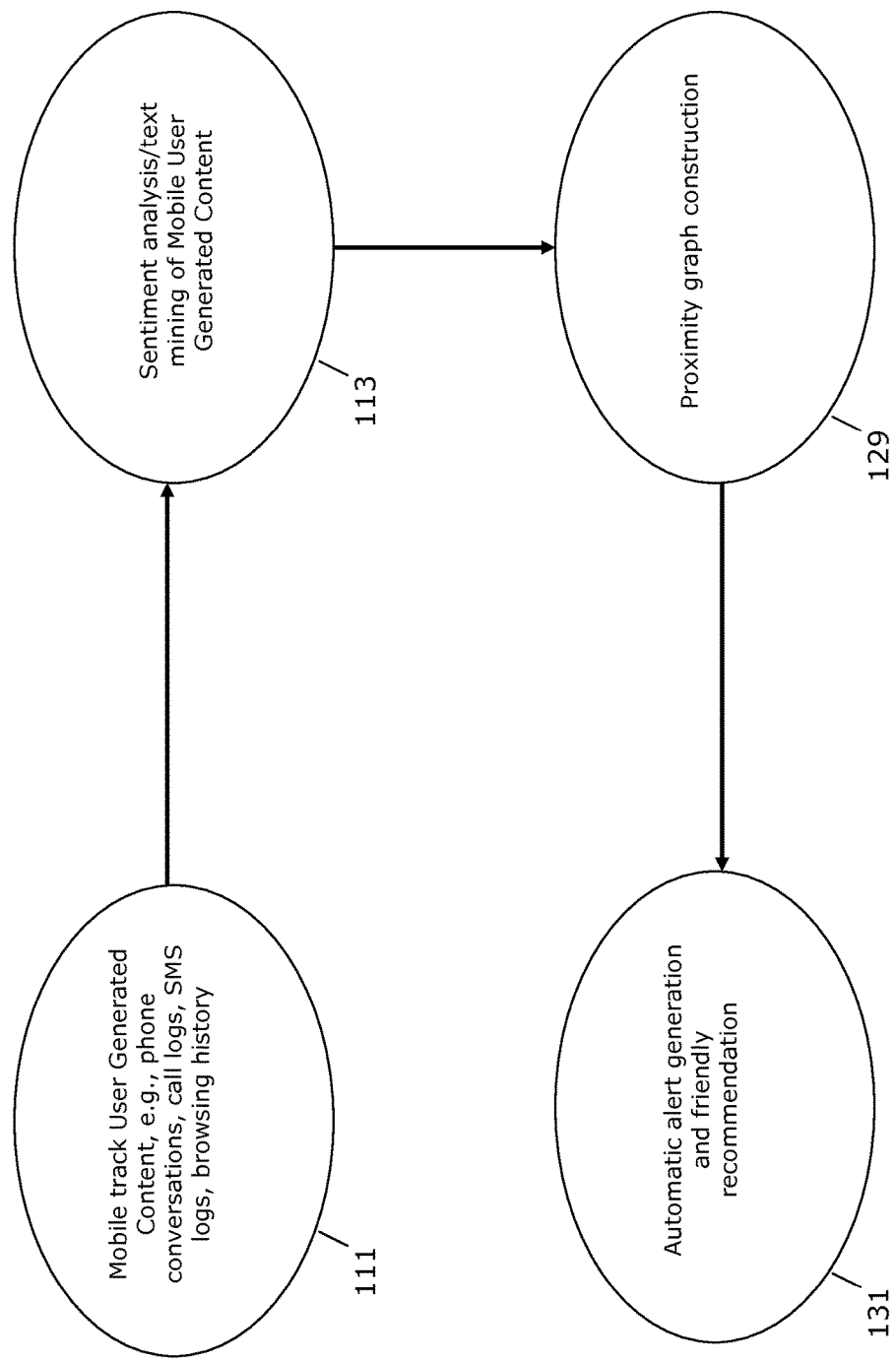
FIG. 1 schematically illustrates a process flow.

Specific reference will now be made herebelow to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

Broadly contemplated herein, in accordance with at least one embodiment of the invention, are methods and arrangements which sufficiently take advantage of inherent aspects of mobile phones and networks in view of their widespread use, to permit an enhancement and refinement of an understanding and characterization of social networking relationships. General steps now to be discussed can be appreciated from a general process flow schematically illustrated in FIG. 1.

In accordance with at least one embodiment of the invention, a mobile phone includes a utility or application which internally tracks a user's every call conversation (111), and a utility or application which performs sentiment analysis of conversations to assess relationship health of the parties involved in the conversation (113). In the latter instance, text-mining with respect to call conversations and/or exchanged text messages (e.g., SMS [short messaging service] messages) can also be performed to appreciate context of one or more conversations or interactions between users.

In accordance with at least one embodiment of the invention, a utility or application on a mobile phone may also track supplementary information such as call durations, social networking relationship status (if available), phone contacts, Bluetooth™ vicinity contacts, and other information. ("Bluetooth" is a registered trademark of Bluetooth SIG, Inc., of Kirkland, Wash.) Such information can also help improve the accuracy of the assessing relationship health. This can be used to dynamically create and update a proximity graph that depicts relationship health between people (e.g., via a metric comprising a quantitative relationship health index, as will be appreciated more fully below) and also can depict the mood of people at various time instances (129). A graph so created can be analyzed in different ways and then can be utilized to prompt automatic alerts to a user, as well as useful social or commercial recommendations (131).

Figure 2:
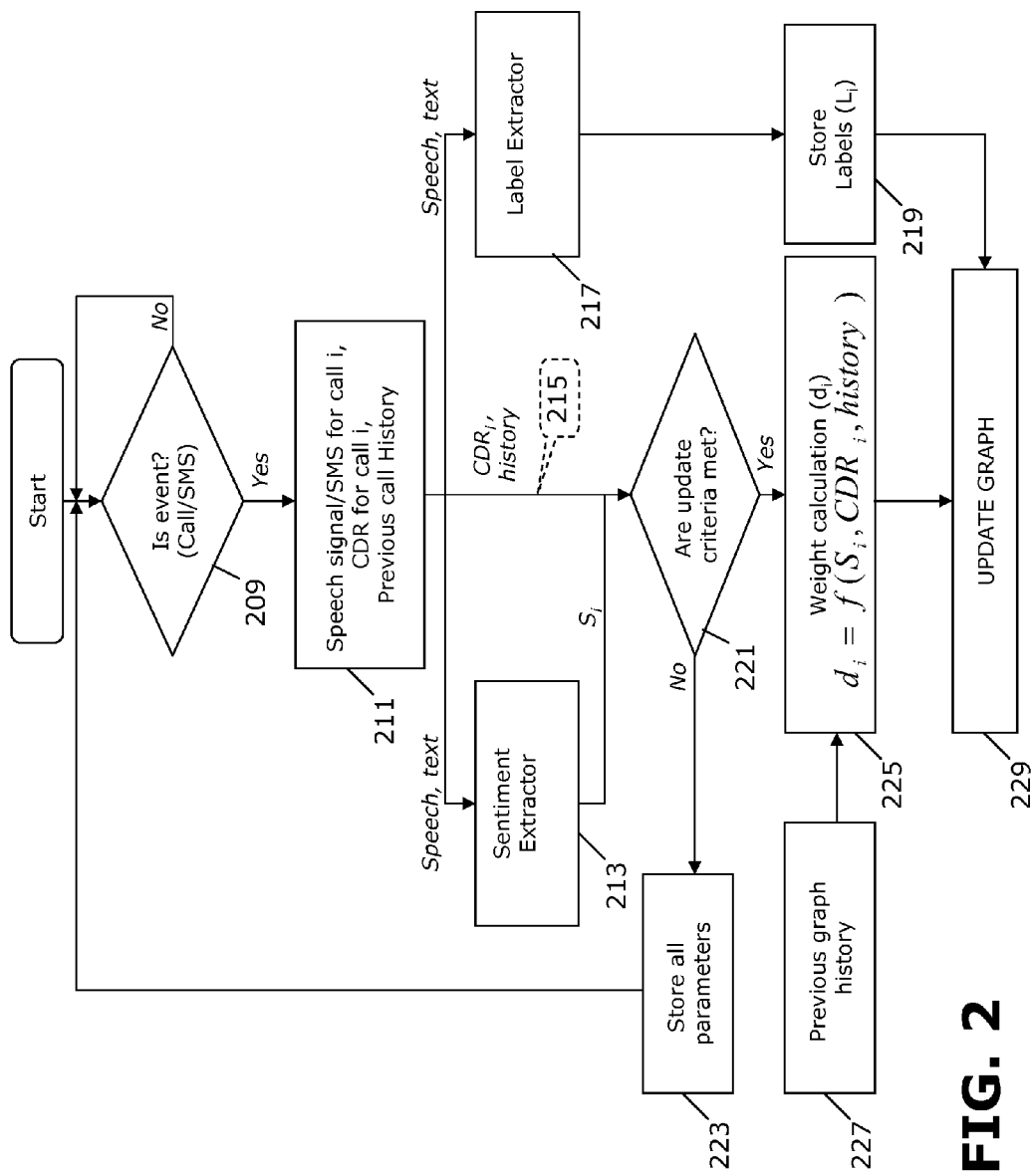
FIG. 2 schematically illustrates a process for constructing a proximity graph.

FIG. 2 schematically illustrates a process for constructing a proximity graph, in accordance with at least one embodiment of the invention. As shown, if (209) an event such as a call or SMS/text message is detected, some data can be obtained (211). If the event is a call, the corresponding speech signal can be input for analysis via a sentiment extractor (213). If the event is a text message (which may be self-standing or could accompany a call), then text therefrom can be submitted for such analysis. The call or text is also entered into call data records (CDR) (215); other historically relevant information can be obtained here as well, in a manner to be appreciated more fully below.

Optionally, in accordance with at least one embodiment of the invention, a label extractor can also be used (217) to extract information from a call or text, or to otherwise obtain contact information from a contact list or social network source; this can assist in determining relationship closeness. More particularly, a label can be derived directly, e.g., from a social network (which may offer labels such as "friend", "close friend" or "relative"), or could alternatively be determined quantitatively on the basis of data already assimilated (wherein, e.g., given a sufficient number of exchanges involving positive sentiment over time, someone could automatically be labeled as a "friend"). Labels can then be stored (219) and then used in a manner to be better appreciated below.

For sentiment analysis of voice or text, in accordance with at least one embodiment of the invention (213), conversations or exchanges can be classified into coarse categories (e.g., positive or negative) and/or fine categories (e.g., anger, happiness, excitement, love, convinced, etc.). These sentiments then can weigh into a final calculation, as discussed below, to help characterize the health or closeness of a relationship between the two people involved. For background purposes, illustrative and non-restrictive examples of sentiment analyzers that could be employed herein may be found in the following publications: Ezzat et al., "Sentiment Analysis of Call Centre Audio Conversations using Text Classification" (*Intl. Journal of Computer Information Systems and Industrial Management Applications*, Vol. 4 [2012], pp. 619-627); and Schuller et al., "Recognising Realistic Emotions and Affect in Speech: State of the art and Lessons Learnt from the First Challenge" (*Speech Communication*, Vol. 53, Issue 9-10, pp. 1062-1087).

In accordance with at least one embodiment of the invention, an advance determination can be made as to how often a proximity graph can be updated (221). This can thus trigger updates based on a number of calls or texts that come in (e.g., after every 100 calls and/or texts), or based on predetermined time periods (e.g., every two weeks). If update criteria are not met, the obtained parameters (including sentiment data, CDR and/or other history) are stored (223) and the process starts anew and is repeated until the update criteria indeed are met.

In accordance with at least one embodiment of the invention, a weight or social proximity score of one individual with respect to another is calculated as a function of sentiment, CDR and other history (225). Here, history other than CDR can involve supplementary details such as the name under which a contact is stored (e.g., "Dad") and social network information; such details can help automatically infer a relationship with another individual. Other contributing information can derive from text mining and/or automatic speech recognition, which can pinpoint keywords in a conversation or exchange that might point to a relationship with an individual. For instance, a close family relationship can be inferred from "Hi, Dad" in a conversation or exchange. Upon determining weight/score, previous graph history can then be incorporated (227) to create an updated graph 229. Calculation of the score may be performed via an application or utility at the phone itself, or may be performed at another location (e.g., associated with a telecom company) in a manner to then be downloadable by the phone.

Figure 3:
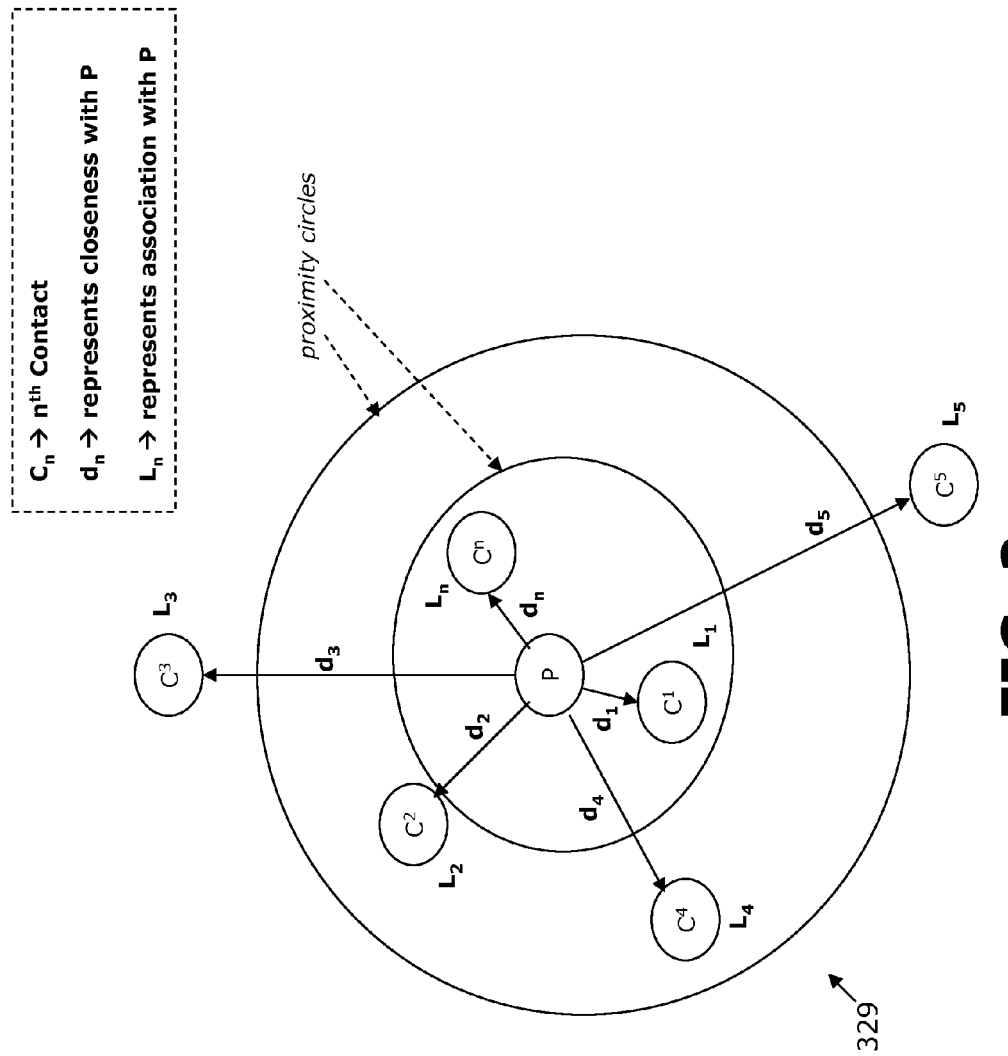
FIG. 3 provides an illustrative example of a proximity graph.

FIG. 3 provides an illustrative example of a proximity graph 329, in accordance with at least one embodiment of the invention. Parameters and values relating to the graph may simply be stored for further use by an application or utility, and/or a visual rendering of the graph may be available to be generated on a display (e.g., a smartphone screen) for the informative benefit of a user. (In a variant embodiment, data can be displayed to the user in another manner such as via a spreadsheet or other medium which can show a list of contact names and corresponding scores.) As shown, person P may have several contacts C in his or her network. Proximity distances d can be calculate d as discussed above. An additional label L can be added to characterize the association of a person with respect to another; this may be derived in a manner as discussed above (e.g., via a label extractor as indicated at 217 in FIG. 2). "Proximity circles", or quantitative benchmarks, can be applied ahead of time to determine whether one or more individuals fall within a certain proximity range. These can be graded, e.g., on a scale of one to five, with "five" representing the closest/healthiest connections or relationships, and "one" representing the most distant.

In accordance with at least one embodiment of the invention, there are numerous manners for potentially leveraging valuable information that can be derived from a proximity graph. By way of an illustrative working example, automatic alerts can be sent to the user with respect his/her close contacts (e.g., level 4 or 5) occasions such as birthdays, wedding anniversaries, etc. Based on past calling patterns, friendly recommendations can be provided to the user to maintain healthier relationship with his/her contacts; e.g., if a user neglects to call a close friend or relative in contrast to an established pattern, the utility or application can remind him or her to do so. Sentiment analysis can be leveraged so that, e.g., if a particularly harsh or angry conversation takes place with a close contact, then after such a phone call the utility or application can recommend a mind-diverting activity for the user. Social network updates can be pushed for contacts within given proximity circles (e.g., levels 4 or 5), and personalized ads can be sent to users based on analyzed sentiments. Recommendations can be made to a user for particularly useful calling plans with respect to friends, family or a network in general, based on calling patterns captured by proximity graphs.

Figure 4:
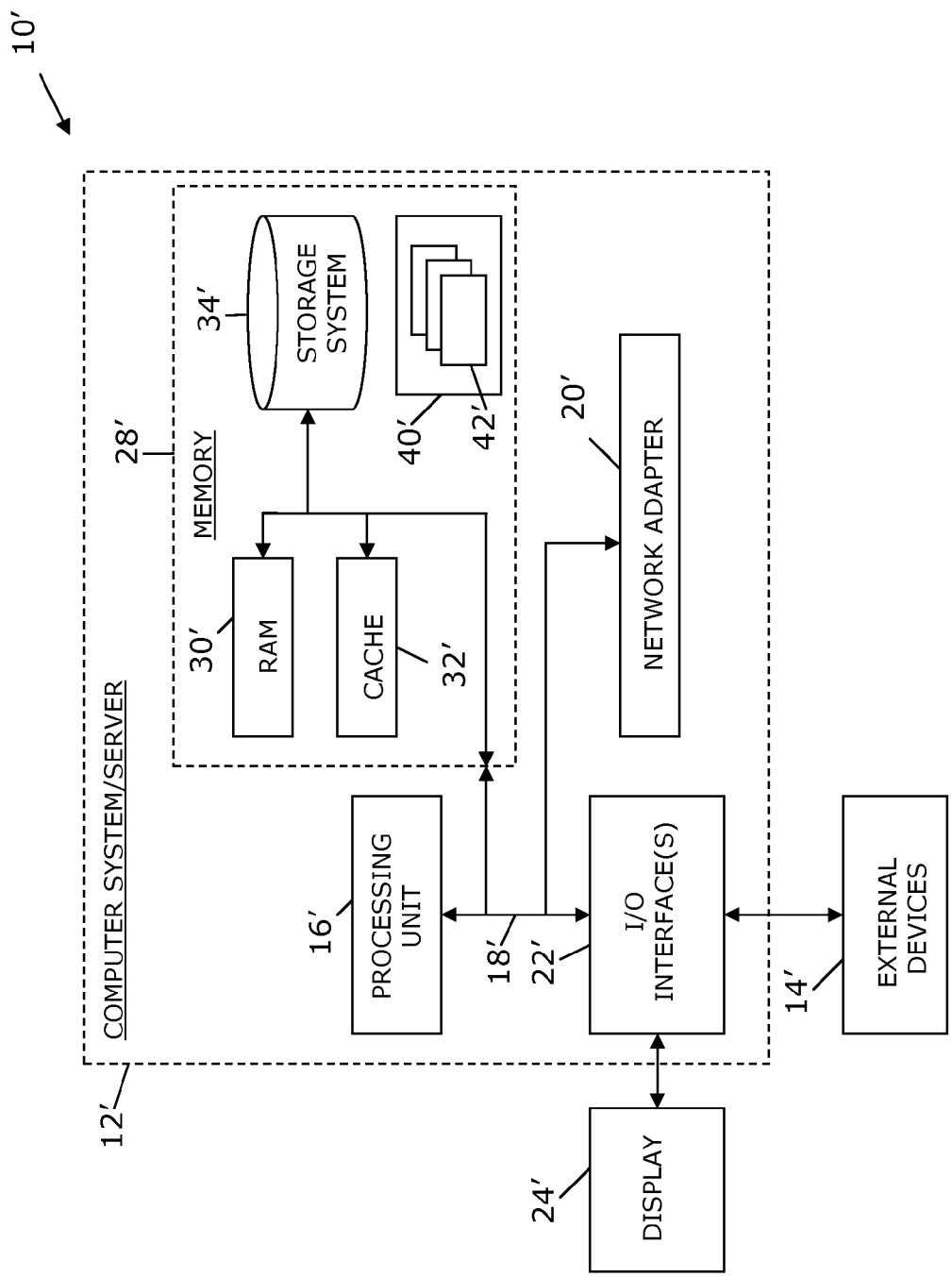
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of rendering social proximity networks for mobile phones, said method comprising:
   utilizing at least one processor to execute computer code configured to perform the steps of:
   initiating obtaining of communication data for a mobile phone of a user in response to a call conversation between the user and at least one mobile phone contact, wherein the communication data comprises a speech signal of the call conversation and supplementary information comprising a duration of the call conversation and a social networking relationship status of the user and the at least one mobile phone contact;

said obtaining comprising mining text data from the speech signal of the call conversation and categorizing the call conversation into a sentiment category;

deriving from the communication data and the social networking relationship status, a social proximity score for the at least one mobile phone contact that has communicated with the mobile phone;

the social proximity score being based at least in part on sentiment analysis of one or more words of the communication data and the sentiment category of the call conversation and the social proximity score identifying a closeness a relationship of the at least one mobile phone contact to a user of the mobile phone;

storing the social proximity score;

dynamically creating a proximity graph that depicts relationship health between the user and the at least one mobile phone contact based on a metric comprising a quantitative relationship health index and a mood of the user at a time of the call conversation, said metric being derived from the duration of the call conversation, wherein the proximity graph includes a label for each of the relationships depicted in the proximity graph, wherein the label is derived from at least one of the social networking relationship and historical categorized call conversations; and issuing a prompt from the mobile phone, based on the proximity score and the quantitative relationship health index, the prompt containing at least one of: a reminder to contact the at least one mobile phone contact and a recommended activity other than a reminder to contact the at least one mobile device contact.

2. The method according to claim 1, wherein the at least one mobile phone contact comprises at least two mobile phone contacts.

3. The method according to claim 1, wherein said obtaining comprises analyzing non-social media content of a text message.

4. The method according to claim 3, wherein said analyzing comprises performing sentiment analysis on the text message.

5. The method according to claim 1, wherein said obtaining comprises entering data into a call data record.

6. The method according to claim 5, wherein said deriving comprises obtaining historical data with respect to non-social media content of at least one of: the call conversation and a text message.

7. The method according to claim 6, wherein said analyzing comprises performing sentiment analysis on the non-social media content of at least one of: the call and the text message.

8. The method according to claim 7, wherein said deriving comprises deriving a social proximity score as a function of the sentiment analysis data, data from the call data record, and the historical data.

9. The method according to claim 1, wherein said deriving comprises obtaining historical data with respect to non-social media content of at least one of: the call conversation and a text message.

10. The method according to claim 1, comprising displaying the social proximity score.

11. The method according to claim 1, comprising plotting the social proximity score with respect to the at least one mobile phone contact on the proximity graph.

12. The method according to claim 10, comprising dynamically updating the proximity graph.

13. An apparatus for rendering social proximity networks for mobile phones, said apparatus comprising:

at least one processor; and a computer readable storage medium having computer readable program code embodied therewith and executable by the at least one processor, the computer readable program code comprising:

computer readable program code configured to initiate obtaining of communication data for a mobile phone of a user in response to a call conversation between the user and at least one mobile phone contact, wherein the communication data comprises a speech signal of the call conversation and supplementary information comprising a duration of the call conversation and a social networking relationship status of the user and the at least one mobile phone contact;

said obtaining comprising mining text data from the speech signal of the call conversation and categorizing the call conversation into a sentiment category;

computer readable program code configured to derive from the communication data and the social networking relationship status a social proximity score for the at least one mobile phone contact that has communicated with the mobile phone;

the social proximity score being based at least in part on sentiment analysis of one or more words of the communication data and the sentiment category of the call conversation and the social proximity score identifying a closeness a relationship of the at least one mobile phone contact to a user of the mobile phone;

computer readable program code configured to store the social proximity score;

computer readable program code configured to dynamically create a proximity graph that depicts relationship health between the user and the at least one mobile phone contact based on a metric comprising a quantitative relationship health index and a mood of the user at a time of the call conversation, said metric being derived from the duration of the call conversation, wherein the proximity graph includes a label for each of the relationships depicted in the proximity graph, wherein the label is derived from at least one of the social networking relationship and historical categorized call conversations; and computer readable program code configured to issue a prompt from the apparatus, based on the proximity score and the quantitative relationship health index, the prompt containing at least one of: a reminder to contact the at least one mobile phone contact and recommended activity other than a reminder to contact the at least one mobile device contact.

14. A computer program product for rendering social proximity networks for mobile phones, said computer program product comprising:

a computer readable storage medium having computer readable program code embodied therewith, the computer readable program code comprising:

computer readable program code configured to initiate obtaining of communication data for a mobile phone of a user in response to a call conversation between the user and at least one mobile phone contact, wherein the communication data comprises a speech signal of the call conversation and supplementary information comprising a duration of the call conversation and a social networking relationship status of the user and the at least one mobile phone contact;

said obtaining comprising mining text data from the speech signal of the call conversation and categorizing the call conversation into a sentiment category;

computer readable program code configured to derive from the communication data and the social networking relationship status a social proximity score for the at least one mobile phone contact that has communicated with the mobile phone;

the social proximity score being based at least in part on sentiment analysis of one or more words of the communication data and the sentiment category of the call conversation and the social proximity score identifying a closeness a relationship of the at least one mobile phone contact to a user of the mobile phone;

computer readable program code configured to store the social proximity score;

computer readable program code configured to dynamically create a proximity graph that depicts relationship health between the user and the at least one mobile phone contact based on a metric comprising a quantitative relationship health index and a mood of the user at a time of the call conversation, said metric being derived from the duration of the call conversation, wherein the proximity graph includes a label for each of the relationships depicted in the proximity graph, wherein the label is derived from at least one of the social networking relationship and historical categorized call conversations; and computer readable program code configured to issue a prompt from the apparatus, based on the proximity score, the prompt containing at least one of: a reminder to contact the at least one mobile phone contact and recommended activity other than a reminder to contact the at least one mobile device contact.

15. The computer program product according to claim 14, wherein the at least one mobile phone contact comprises at least two mobile phone contacts.

16. The computer program product according to claim 14, wherein said computer readable program code is configured to analyze non-social media content of a text message.

17. The computer program product according to claim 16, wherein said computer readable program code is configured to perform sentiment analysis on the text message.

18. The computer program product according to claim 14, wherein said computer readable program code is configured to plot the social proximity score with respect to the at least one mobile phone contact on a proximity graph.

19. A method comprising:

initiating obtaining of communication data for a mobile phone of a user in response to a call conversation between the user and at least one mobile phone contact, the communication data including sentiment analysis data and data from a call data record comprising a duration of the call conversation and a social networking relationship status of the user and the at least one mobile phone contact;

said obtaining comprising obtaining at least part of the communication data from the speech signal of the call conversation, mining text data from the speech signal and categorizing the call conversations into a sentiment category;

deriving from the communication data and the social networking relationship status, a social proximity score for mobile phone contacts as a function of at least the sentiment analysis data and the data from the call data record;

the social proximity score being based at least in part on sentiment analysis of one or more words of the communication data and the sentiment category of the call conversation and the social proximity score identifying a closeness a relationship of the at least one mobile phone contact to a user of the mobile phone;

creating a proximity graph based on the social proximity score with respect to each of the at least two individuals, said proximity graph depicting relationship health based on a metric comprising a quantitative relationship health index and a mood of the user at a time of the call conversation, said metric being derived from a duration of the call conversation, wherein the proximity graph includes a label for each of the relationships depicted in the proximity graph, wherein the label is derived from at least one of the social networking relationship and historical categorized call conversations; and issuing a prompt from the mobile phone, based on the proximity graph, the prompt containing at least one of: a reminder to contact at least one mobile phone contact and a recommended activity other than a reminder to contact at least one mobile device contact.

20. The method according to claim 1, wherein the prompt is designed to improve the social proximity score.

* * * * *